INVENTORS
Lawrence E. Burkhardt
Charles H. Johnson

United States Patent Office 3,500,164
Patented Mar. 10, 1970

3,500,164
METHOD AND APPARATUS FOR PROVIDING ELECTRICAL ENERGY TO A LOAD WITH A PREDETERMINED TIME DELAY
Lawrence E. Burkhardt, Burtonsville, and Charles H. Johnson, Silver Spring, Md., assignors to the United States of America as represented by the Secretary of the Navy
Filed Oct. 23, 1967, Ser. No. 677,295
Int. Cl. H03k 6/04; H02j
U.S. Cl. 320—1                              5 Claims

ABSTRACT OF THE DISCLOSURE

A circuit having an input capacitor is charged to an input voltage. A second capacitor is also charged to the full input voltage and discharges into a third capacitor in an RC timing arrangement. When the sum of the first and third capacitor voltages build up to the strike voltage of a threshold device, current flows thereby discharging electrical energy stored in the capacitors into a load.

BACKGROUND OF THE INVENTION

The invention relates generally to electrical energy transfer apparatus and more particularly to RC timing apparatus for delivering a high energy output to a load at a predetermined time.

Prior art RC timers have generally included an input capacitor which is charged to an input voltage and a secondary capacitor into which the input capacitor is discharged with time. The load, or threshold device, which is sensitive to a given strike voltage is connected across the secondary capacitor. It has been demonstrated that for reasonable timing accuracy the strike voltage is preferably about one third the value of the input voltage in order to operate within the more linear portion of the exponentially rising voltage on the secondary capacitor. Since the energy available to the load is a function of the strike voltage, which must be held to roughly one third of the input voltage, and the capacitor values, an increased energy output can be achieved in such an arrangement only by the uneconomical alternatives of larger capacitor values or an increase in the input voltage. Attempts to overcome these disadvantages have included the use of voltage doubling arrangements and solid state switching devices, but these alternatives generally lack simplicity or can not be initiated and controlled by a single input voltage pulse.

SUMMARY OF THE INVENTION

Accordingly, one object of this invention is to provide an improved electrical energy transfer apparatus.

Another object of this invention is to provide an electrical energy transfer apparatus responsive to a single input voltage pulse.

Still another object is to provide an electrical energy transfer apparatus having a high energy output in relation to its input voltage.

Yet another object of this invention is to provide an RC timer having a high energy output in relation to its capacitor values.

A further object is to provide a high energy output electrical energy transfer apparatus having good timing accuracy.

Briefly, in accordance with one embodiment of the invention, these and other objects are obtained by providing in an electrical energy transfer apparatus the combination of an input capacitor and a secondary capacitor, both of which are charged to full input voltage, and a timing capacitor which acts in series with the secondary capacitor to discharge through a threshold device into a load when the charge thereon reaches the threshold level of the device.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIGS. 2a–2e are graphical representations of various operational conditions of the electrical energy transfer device.

DESCRIPTION OF THE PREFERRED EMBODIMENT

Figure 1:
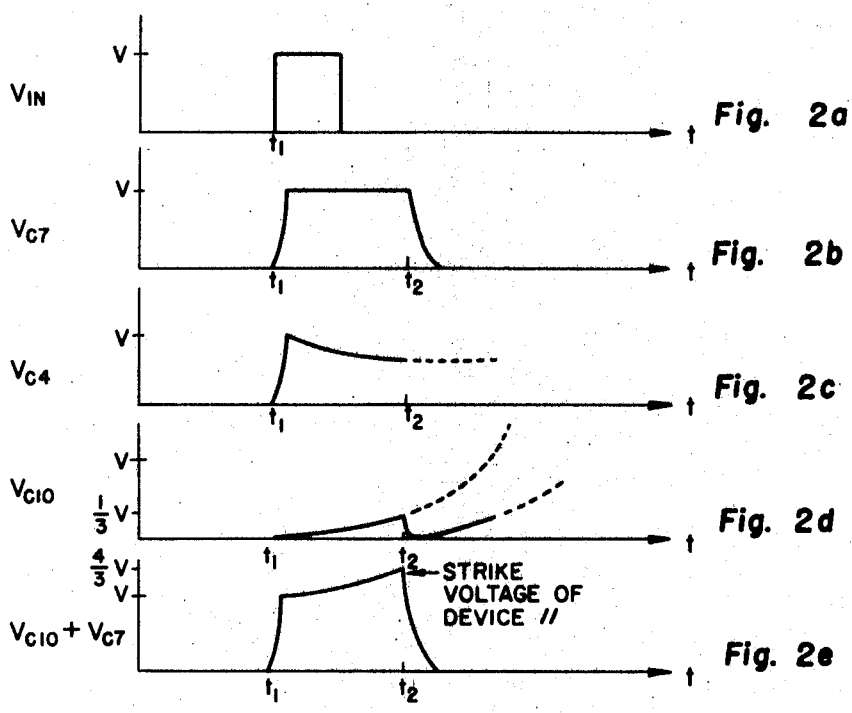
FIG. 1 is a schematic circuit diagram of an embodiment of the electrical energy transfer device.
Figure 1:
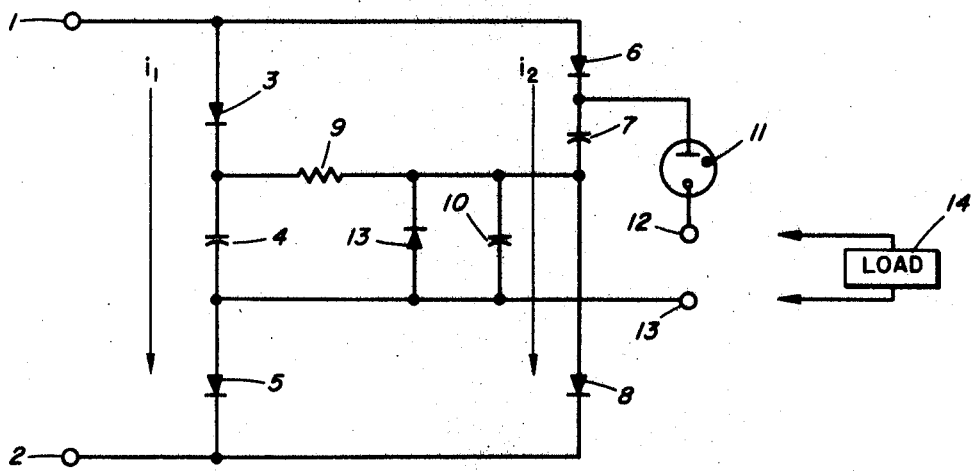

Referring now to the drawings and more particularly to FIG. 1 thereof wherein an embodiment of the electrical energy transfer apparatus receives a positive voltage pulse of magnitude V at a pair of input terminals 1 and 2, causing a charging current $i_1$ to flow through a branch circuit connected across the terminals including a series connected unidirectional device such as diode 3, an electrical energy storage device such as capacitor 4, and a unidirectional device such as diode 5; and a charging current $i_2$ to flow through another circuit connected across the terminals which includes a unidirectional device such as diode 6, an electrical energy device such as capacitor 7 and a unidirectional device such as diode 8. Capacitors 4 and 7 are each rapidly charged to the input voltage V by charging currents $i_1$ and $i_2$, respectively. Capacitor 4, the input capacitor, then begins to discharge through resistor 9 into a capacitor 10 with a time constant determined by the values of resistor 9 and capacitors 4 and 10. Capacitors 7 and 10 form a series circuit with a threshold device such as a glow tube and a pair of output terminals 12 and 13 which may be connected to a load 14. Assuming the load is connected, the voltage on capacitor 7 charge to the input voltage and adds to the voltage on capacitor 10 which increases with time until the combined voltage across the series capacitors 7 and 10 reaches the break down voltage or strike voltage of the threshold device 11 which then changes from a non-conductive to a conductive state. At that instant both capacitors 7 and 10 discharge into the load 12. The capacitor discharge pulse can be used, for example, to arm or to fire a fuze.

FIGS. 1a–2e show the voltages on various circuit elements as a function of time. As shown in FIG. 2b, capacitor 7 charges to the full input voltage V in a very short time, the rise time being limited only by the small forward resistance of diodes 6 and 8 and the associated wiring. Capacitor 4 likewise rises quickly to the full input voltage V, as shown in FIG. 2c, but then begins to discharge into capacitor 10. FIG. 2d shows the exponential rise of voltage on capacitor 10. The series voltage on capacitor 7 and 10 is shown in FIG. 2e. For a given threshold device strike voltage of four-thirds the input voltage, capacitor 10 and resistor 9 are chosen so as to provide the desired time delay between the application of the input pulse at $t_1$ and the firing of device 11 at $t_2$. The voltage on capacitor 4 will gradually decrease until it reaches equilibrium with capacitor 10. By choosing four-thirds V to match the strike voltage, it is possible to operate within the substantially linear portion of the exponential voltage curve of capacitor 10, thus retaining good timing accuracy. By utilizing the unique series arrangement of capacitors 7 and 10 it is thereby possible to retain the timing accuracy of prior art devices while at the same time increasing the available voltage output by four times. Diodes 3 and 6 function to prevent discharge between capacitors 4 and 7, whereas diode 13 provides more efficient discharge of capacitor 7 when device 11 conducts but may be omitted if desired. Also, diode 8 provides for capacitor 7 to charge to the full input voltage and diode 5 prevents diode 8 from acting as a short across capacitor 10 when the latter capacitor is being charged.

Obviously, numerous modifications and variations of the present invention are possible in light of the above teachings. It is therefore to be understood that within the scope of the appended claims the invention may be practiced otherwise then as specifically described herein.

What is new and desired to be secured by Letters Patent of the United States is:

1. Electrical energy transfer apparatus comprising in combination
   a plurality of means for storing electrical energy,
   means for applying unidirectional electrical energy from a single source to a first one and second one of said plurality of means,
   means for transferring electrical energy from said first one of said plurality of means to a third one of said plurality of means,
   conducting means for providing a conducting circuit path when voltage applied to said conducting means is exceeded,
   a pair of output terminals connectable to a load, and
   means for connecting said second one of said means, said third one of said means, and said conducting means in series between said pair of output terminals.

2. The apparatus of claim 1 further comprising
   means for inhibiting said first and second one of said plurality of means from transferring energy to one another.

3. The apparatus of claim 2 further characterized in that each of said plurality of means comprises a capacitive impedance device.

4. Electrical energy transfer apparatus comprising in combination
   input terminals for receiving an input voltage
   a pair of branch circuits connected between said terminals each having a series connection of a capacitor between a pair of diodes, said capacitors being chargeable to the level of said input voltage,
   a discharge circuit connected across the capacitor in one of said branch circuits and having a series connected resistance and capacitor, said last recited capacitor being chargeable through said resistance by the charge on said capacitor of said one branch circuit, whereby an R-C time delay is effected,
   an output circuit connectable across a load and having a device responsive to a predetermined voltage higher than the input voltage, said output circuit being connected in series with the capacitor in the other of said branch circuits and said last recited capacitor to apply a voltage to a load connected therein when the combined voltages on said capacitor in the other branch circuit and said last recited capacitor exceeds the predetermined voltage of said device.

5. A method for providing electrical energy to a load with a predetermined time delay comprising the steps of
   simultaneously charging each of a first energy storage device and a second energy storage device from a unidirectional energy source to the magnitude of said energy source,
   discharging said first energy storage device to charge a third energy storage device,
   adding the charge on said second and said third energy storage devices, and
   transferring the charge on said second and said third energy storage devices to a load when the sum of the charge on said second and said third energy storage devices exceeds a predetermined value.

References Cited

UNITED STATES PATENTS

| 1,902,279 | 5/1933 | Blomberg | 317—151 |
| 2,972,112 | 2/1961 | Langan | 328—129 X |
| 3,106,667 | 10/1963 | Winchel | 307—110 X |
| 3,243,683 | 3/1966 | Ackley | 307—110 |

BERNARD KONICK, Primary Examiner

JOSEPH F. BREIMAYER, Assistant Examiner

U.S. Cl. X.R.

307—110, 293; 328—35, 129